(12) United States Patent
Botman

(10) Patent No.: US 10,251,350 B2
(45) Date of Patent: Apr. 9, 2019

(54) GROWING SYSTEM AND METHOD FOR GROWING PLANTS ON WATER

(71) Applicant: JALMAJA HOLDING B.V., Hoorn (NL)

(72) Inventor: Johannes Petrus Maria Botman, Hoorn (NL)

(73) Assignee: JALMAJA HOLDING B.V., Hoorn (NL)

( * ) Notice: Subject to any disclaimer, the term of this patent is extended or adjusted under 35 U.S.C. 154(b) by 62 days.

(21) Appl. No.: 14/442,349

(22) PCT Filed: Nov. 13, 2013

(86) PCT No.: PCT/NL2013/050814
§ 371 (c)(1),
(2) Date: May 12, 2015

(87) PCT Pub. No.: WO2014/077682
PCT Pub. Date: May 22, 2014

(65) Prior Publication Data
US 2016/0270310 A1    Sep. 22, 2016

(30) Foreign Application Priority Data

Nov. 13, 2012  (NL) ...................................... 2009795
Apr. 4, 2013   (NL) ...................................... 2010567

(51) Int. Cl.
*A01G 31/02* (2006.01)
*A01G 22/00* (2018.01)
(Continued)

(52) U.S. Cl.
CPC ........... *A01G 31/02* (2013.01); *A01G 9/0293* (2018.02); *A01G 9/0295* (2018.02); *A01G 22/00* (2018.02);
(Continued)

(58) Field of Classification Search
CPC ...... A01G 31/02; A01G 31/00; A01G 31/001; A01G 27/006; A01G 27/02; A01G 27/06; A01G 27/00
(Continued)

(56) References Cited

U.S. PATENT DOCUMENTS 2,531,562 A * 11/1950 Eve .................. A01G 9/028
                                              220/560
2,600,718 A *  6/1952 Wilson ................ A01G 31/02
                                              47/31
(Continued)

FOREIGN PATENT DOCUMENTS

CA     2892131 A1 * 11/2016 ............... A01G 1/00
FR     2292419 A1    6/1976
(Continued)

OTHER PUBLICATIONS

FR 2400323, Aug. 1977, English translation.*
International Search Report, dated Jan. 29, 2014, from corresponding PCT application.

*Primary Examiner* — Magdalena Topolski
(74) *Attorney, Agent, or Firm* — Aeon Law PLLC; Adam L. K. Philipp; David V. H. Cohen

(57) ABSTRACT

Growing system for growing plants, for example vegetables and ornamental plants, includes a container tray (1) which is floatably arranged in a liquid reservoir (14). The container tray (1) is configured to float on nutrient water (6) during use and has at least one opening (4) which is arranged in a tray bottom (2) of the container tray (1) for bringing a growth substrate (11) which is arranged on the container tray (1) into contact with the nutrient water (6). The container tray (1) is a substantially flat container tray (1) which includes an upright tray edge (3), and wherein the at least one opening (4) has an upright opening edge (5) having a height which
(Continued)

is such that the growth substrate (11) is situated above a water line of the nutrient water (6) during use.

28 Claims, 5 Drawing Sheets

(51) Int. Cl.
*A01G 24/28* (2018.01)
*A01G 24/44* (2018.01)
*A01G 24/00* (2018.01)
*A01G 9/029* (2018.01)
*A01G 24/48* (2018.01)
*A01G 24/18* (2018.01)

(52) U.S. Cl.
CPC ............ *A01G 24/00* (2018.02); *A01G 24/28* (2018.02); *A01G 24/44* (2018.02); *A01G 24/18* (2018.02); *A01G 24/48* (2018.02); *Y02P 60/216* (2015.11)

(58) Field of Classification Search
USPC ...................... 43/86, 73; 47/86, 73
See application file for complete search history.

(56) References Cited

U.S. PATENT DOCUMENTS

| | | | | | |
|---|---|---|---|---|---|
| 3,142,133 | A | * | 7/1964 | Brooks | A01G 9/0295 47/73 |
| 3,660,933 | A | * | 5/1972 | Wong, Jr. | A01G 31/02 239/428.5 |
| 4,312,152 | A | * | 1/1982 | Drury | A01G 31/02 47/62 R |
| 4,379,375 | A | * | 4/1983 | Eisenberg | A01G 31/02 47/65 |
| 4,407,092 | A | * | 10/1983 | Ware | A01G 31/02 47/64 |
| 4,669,217 | A | * | 6/1987 | Fraze | A01G 31/001 47/59 R |
| 5,010,686 | A | * | 4/1991 | Rivest | A01G 31/02 47/62 C |
| 5,179,800 | A | * | 1/1993 | Huang | A01G 9/0295 47/73 |
| 5,224,291 | A | * | 7/1993 | Sherfield | A01G 31/02 47/62 R |
| 5,269,094 | A | * | 12/1993 | Wolverton | A01G 31/02 210/602 |
| 5,435,098 | A | * | 7/1995 | Koide | A01G 31/02 47/39 |
| 5,507,116 | A | * | 4/1996 | Gao | A01G 9/0295 47/18 |
| 6,233,870 | B1 | * | 5/2001 | Horibata | A01G 31/02 47/59 R |
| 6,381,901 | B1 | * | 5/2002 | Friedman | A01G 9/028 206/752 |
| 7,320,197 | B2 | * | 1/2008 | Meyer | A01G 9/02 47/59 R |
| 7,448,163 | B2 | * | 11/2008 | Beeman | A01G 9/00 47/60 |
| 2007/0000170 | A1 | * | 1/2007 | Hempenius | A01G 31/02 47/64 |
| 2008/0120903 | A1 | * | 5/2008 | Fair | A01G 9/045 47/65.7 |
| 2013/0205664 | A1 | * | 8/2013 | Hashimoto | A01G 27/02 47/79 |
| 2015/0150202 | A1 | * | 6/2015 | Hessel | A01G 31/00 47/62 R |
| 2015/0216131 | A1 | * | 8/2015 | Van Wingerden | A01G 9/1026 47/59 R |
| 2015/0342127 | A1 | * | 12/2015 | Gallant | A01G 9/02 47/20.1 |

FOREIGN PATENT DOCUMENTS

| | | | | | |
|---|---|---|---|---|---|
| FR | 2400323 | A1 | * | 3/1979 | ............ A01G 27/02 |
| GB | 2263052 | A | * | 7/1993 | ........... A01G 9/0295 |
| NL | 8902482 | A | * | 5/1991 | ............ A01G 31/02 |
| WO | 2010/093248 | A1 | | 8/2010 | |
| WO | 2012/050449 | A1 | | 4/2012 | |

* cited by examiner

GROWING SYSTEM AND METHOD FOR GROWING PLANTS ON WATER

FIELD OF THE INVENTION

The present invention relates to a growing system for growing plants on water, for example vegetables and ornamental plants. According to a further aspect, the invention relates to a method for growing plants on water.

PRIOR ART

It is known to grow leaf plants on a floating body in a basin with nutrient water. In this case, use is made of holes in the floating body, in which a growth substrate or a container with substrate can be placed. The international patent publication WO2010/093248 discloses such a method for growing plants on floating beds. It has been found that this growing system and this growing method can be improved further.

SUMMARY OF THE INVENTION

It is an object of the invention to provide an improved growing system for growing plants on water, wherein the provision of nutrient water to the plants to be grown by the growing system is improved.

This object is achieved by providing a growing system which comprises: a container tray which is floatably arranged in a liquid reservoir and is configured to float on nutrient water during use; at least one opening arranged in a tray bottom of the container tray for bringing a growth substrate which is arranged on the container tray during use into contact with the nutrient water; wherein the container tray is a substantially flat container tray which comprises an upright tray edge, and wherein the at least one opening comprises an upright opening edge having a height which is such that the growth substrate is situated above a water line of the nutrient water during use. Such a container tray (which acts as a floating body on the nutrient water) can be produced in a simple way by thermoforming, vacuum forming, injection-moulding, pressing, 3D printing, etc., and the openings can be made by cutting, sawing or drilling. The upright edges provide additional buoyancy and prevent nutrient water from overflowing into the container tray. This also ensures that the growth substrate is situated above a water line of the nutrient water during use. This embodiment prevents a certain growth substrate from being arranged in the nutrient water which could cause an excessive supply of nutrient water. In addition, the growing system can be dismantled in a simple manner after a growing cycle and can be cleaned effectively and efficiently prior to a new growing cycle.

In a further embodiment, the growth substrate comprises a capillary element which extends from the growth substrate into the nutrient water for transporting the nutrient water to the growth substrate. A technical effect of this embodiment of the present invention is that the capillary element optimizes and increases the supply of nutrient water to the growth substrate.

In the light of the present invention, the term growth substrate is understood to mean an organic soil mixture and/or a plant part from which a plant is grown. In other words, in a group of embodiments, the growth substrate only comprises a(n organic) soil mixture, or only a plant part (a "cutting"), or a combination thereof ('plug'), or a mineral wool material, or a foam-like material. Alternatively, a (mesh) basket pot may surround the soil mixture and the plant part. In a general sense, the growth substrate thus comprises a component from which the plant will be grown.

In a further embodiment, the capillary element is arranged in a bottom of a(n open) substrate container which is present around the growth substrate. This ensures a good connection, even during treatment of the growth substrates, and may possibly even be automated.

In an embodiment, the capillary element comprises a capillary wire element, with the capillary wire element comprising a braided wire element in a further embodiment. A capillary wire element, for example a braided wire element, provides strong capillary action. The capillary wire element may comprise a known rope element. In yet a further embodiment, the capillary element comprises a tube element. In one embodiment, the tube element is a tube element made of, for example, plastic or organic material.

In a further embodiment, the growing system comprises a container for supporting the growth substrate, wherein the container is removably arranged on an opening edge of the at least one opening. This makes it possible to place, displace and remove plants into and out of the container tray automatically in a simple, possibly automated way (for example using specific robot systems).

In an embodiment, the container is arranged over the upright opening edge by means of an inner surface of the container which is congruent with the upright opening edge. In this embodiment, the container can be seen as an external "lid", with the container being arranged over the upright opening edge. Optionally, the opening edge and/or inner surface are provided with one or more spacers, as a result of which the mutual clamping action is defined better, so that removal can take place in an automated manner using robots.

For the stability of a relatively long growth substrate, there is an embodiment in which the container is at least partly arranged extending through the upright opening edge. In this embodiment, a bore in the container forms a light-proof tunnel, in combination with the opening edge, which may be advantageous for growing light-sensitive plants, such as leeks.

In an embodiment, the upright opening edge may be a conical upright opening edge. This has many advantages for automation and self-locating alignment of the container on the conical upright opening edge. This embodiment makes it possible to automate placement of the container on the conical upright opening edge. In an additional embodiment, the container comprises a flange edge which benefits automated engagement of the container.

On a rainy day, the container tray may fill with precipitation. In one embodiment, the tray bottom comprises a drainage channel for discharging water from the container tray in order to discharge the precipitation.

In a further embodiment, the container tray may comprise a tube discharge system which is connected to a discharge opening which is present in the tray bottom. In this embodiment, precipitation may be discharged from the container tray by the discharge opening and the tube discharge system. In an embodiment, the tube discharge system comprises a one-way valve for discharging water from the container tray to a discharge point in one direction, in order to make sure that no water can flow into the container tray through the discharge opening. This prevents backflow into the container tray. In the case of several interconnected container trays, a double-acting one-way valve causes the lever action in the discharge tube to be maintained, even if all the excess rainwater in one of the container trays has already been discharged. In an advantageous embodiment, the one-way valve comprises a one-way ball valve and/or a one-way membrane valve. In an embodiment, the tube discharge system of the container tray is arranged below a water line of the nutrient water.

According to the invention, in an embodiment, the container tray comprises a plurality of openings, i.e. where the growing system comprises a plurality of container trays, wherein the plurality of container trays comprises a disconnectable connection between the tube discharge system of two container trays which are arranged next to one another. In this way, a plurality of container trays are coupled to each other by means of the tube discharge system, so that a modular growing system is obtained having a desired growing capacity.

In a further aspect, it is an object of the invention to provide an improved method for growing plants, for example vegetables and ornamental plants, using the above-mentioned growing system. The method comprises:

raising the growth substrate with the capillary element in the nutrient water during a first growth period in order to stimulate root formation;

placing the growth substrate at a further distance from the nutrient water for a second growth period, with the roots formed during the first growth period and the capillary element at least partly extending into the nutrient water. The significant advantage of the method of the present invention is that the growth substrates can be placed at a distance from the nutrient water, so that a greater resistance to diseases and pests is built up.

BRIEF DESCRIPTION OF THE DRAWINGS

The present invention will now be described in more detail by means of a number of exemplary embodiments, with reference to the attached drawings in FIGS. 1 to 9, wherein the figures show various embodiments of the growing system according to the present invention.

DETAILED DESCRIPTION OF EXEMPLARY EMBODIMENTS

Figure 1:
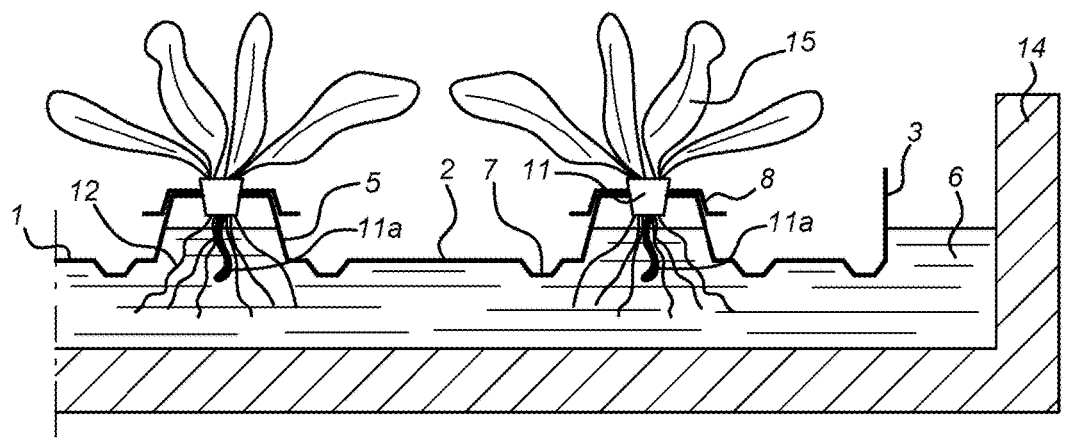
FIG. 1 shows a partial cross-sectional view of an embodiment of the growing system according to the present invention.

The (details of) embodiments of the present invention illustrated in FIGS. 1 to 9a relate to a growing system in which container trays 1 float in a basin 14, i.e. a liquid reservoir 14, on a layer of nutrient water 6 of, for example, a few decimeters, during use. The nutrient water 6 consists of water with nutrients for optimum growth of the plants or growth substrates 11. In an embodiment, the container trays 1 comprise an open hole pattern 4 (openings 4). In a group of embodiments, each opening 4 comprises a round, conical or pylon-shaped upright opening edge 5. The number of, the height and diameter of the openings 4 per container tray 1 depends on the plant 15 to be grown and the growth period thereof. The term plant 15 is understood to refer to the plants to be grown, plant parts and/or growth substrates 11.

In an embodiment, containers 8 are arranged on these openings 4, in which case shoots, plants, cuttings 13, bulbs, tuberous plants, rootstocks (plant parts) and/or growth substrates 11 can be placed in the container 8. In an embodiment, the containers 8 comprise a flange edge 9 in order to make automated processing possible.

Figure 2:
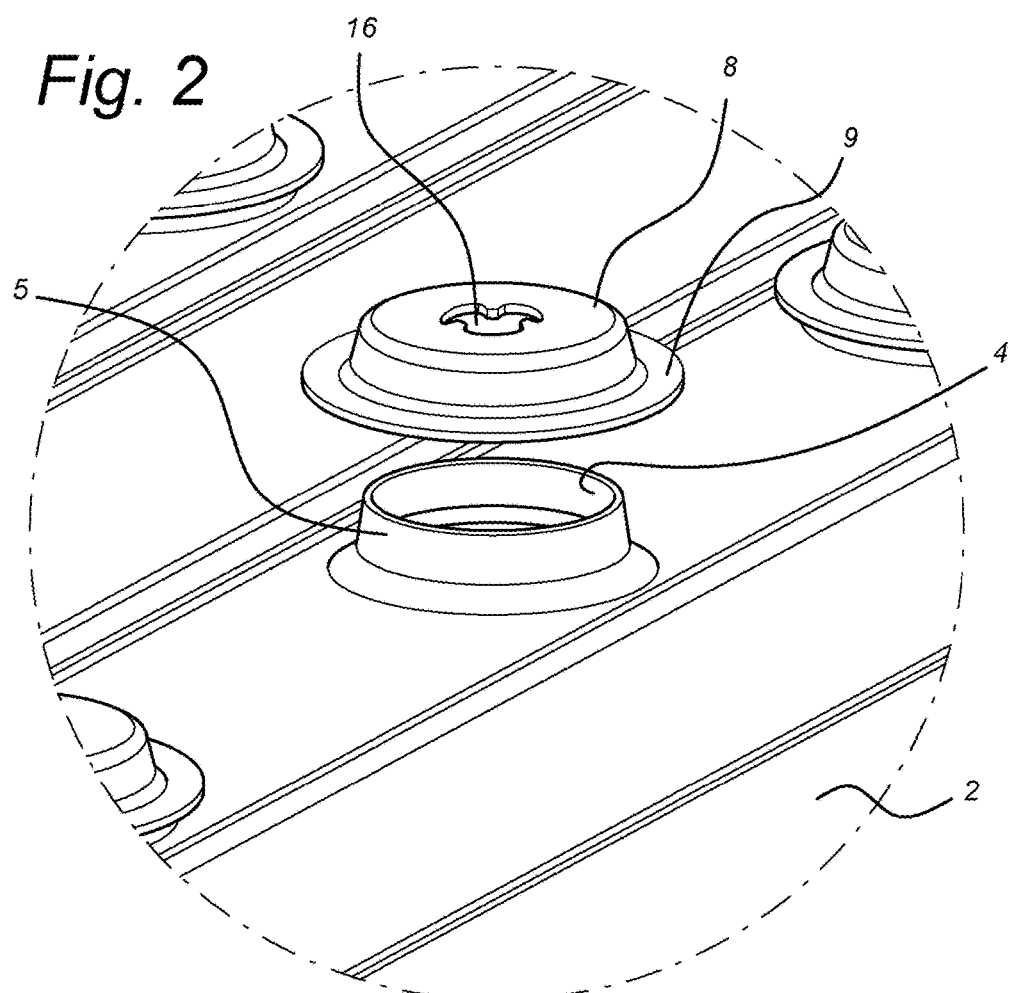
FIG. 2 shows a partial view in perspective of the growing system from FIG. 1.

FIG. 2 shows a detail view of the container 8, wherein the container 8 can be arranged over the upright opening edge 5. The container 8 is furthermore provided with a bore 16 or cutting holder 16 for supporting a plant.

Figure 3:
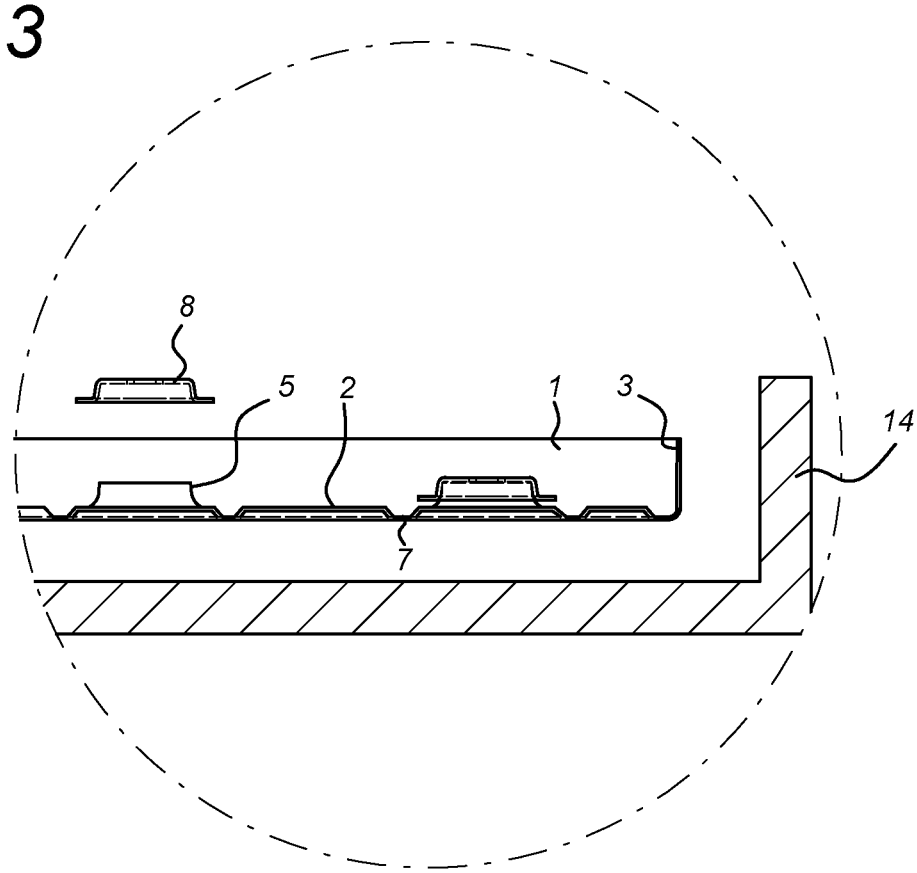
FIG. 3 shows a partial cross-sectional view of a further embodiment of the present growing system.
Figure 3A:
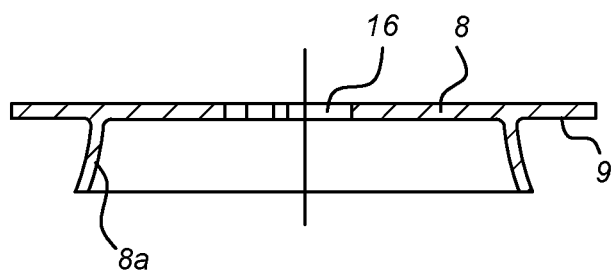
FIG. 3a shows a cross-sectional view of a container which is used in the growing system from FIG. 3.

FIGS. 3 and 3a also show embodiments of a container tray 1 which comprises upright opening edges 5, wherein a container 8 in the shape of a lid can be arranged over the upright opening edge 5. In an embodiment, the container 8 comprises an inner surface 8a which is congruent with the upright opening edge 5. The flange edge 9 makes easy placement and removal of the container 8 possible. The container 8 can be made of plastic by means of injection-moulding.

In an embodiment, the container 8 comprises a conical shape on an inner side. This shape fits exactly over a conically shaped upright opening edge 5 of the container tray 1. The container 8 is usually fixed on the upright opening edge 5. This fixation provides great stability to the container 8 on the container tray 1. In particular for plants which grow tall and when growing plants outdoors—where the wind factor has a great effect—such a fixation provides great stability. A growth substrate 11 or plant part for a plant can be placed in the container 8. An inner diameter of the container 8 is always bigger than an opening 4 of the container tray 1. In an alternative embodiment, the container 8 may have a completely different shape, for example for holding cuttings 13, see for example the embodiment illustrated in FIGS. 4-6.

Figure 4:
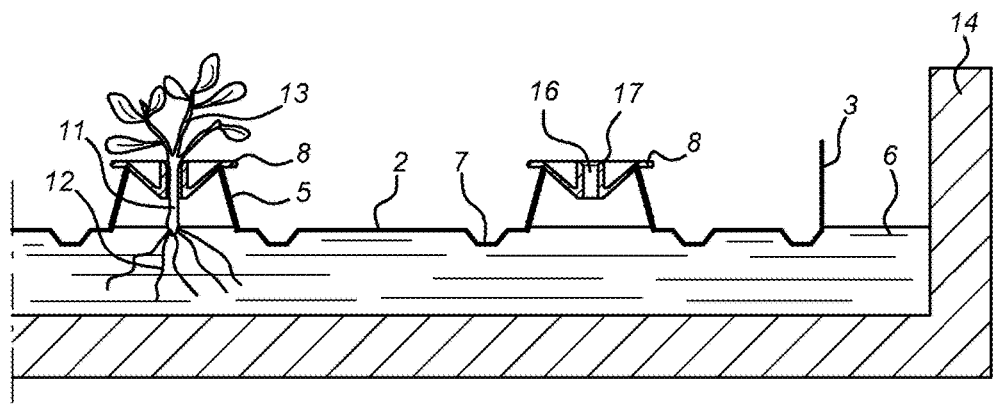
FIG. 4 shows a partial cross-sectional view of yet a further embodiment of the present growing system.
Figure 5:
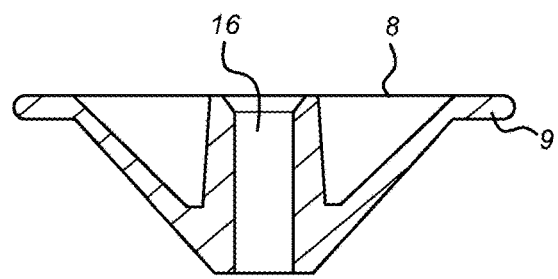
FIG. 5 shows a cross-sectional view of a container which is used in the growing system from FIG. 4.
Figure 6:
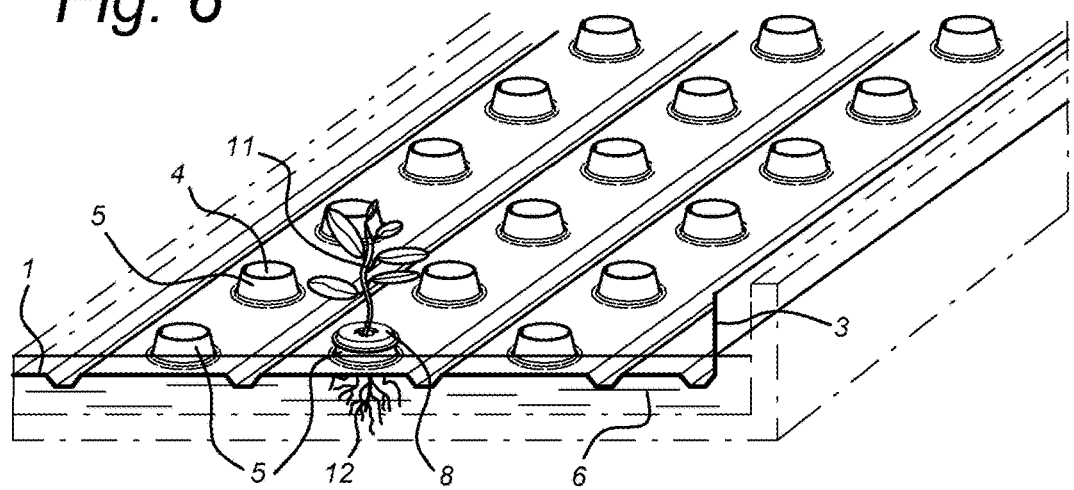
FIG. 6 shows a perspective view of the growing system according to the embodiment from FIG. 4.

FIGS. 4-6 show other embodiments of a container 8, in which the container 8 is at least partly arranged inside the upright opening edge 5. In this embodiment of the container 8, a longer bore 16 is provided in order to provide better support for the plant to be grown. The flange edge 9 makes automated placement of the container 8 possible in this embodiment as well.

According to the present invention, the growth substrate 11 (the plant 15) furthermore comprises a capillary element 11a (see for example FIG. 1) which extends from the growth substrate 11 into the nutrient water 6 for transporting the nutrient water 6 to the growth substrate 11. This has the significant advantage that the capillary element 11a optimizes and increases the supply of nutrient water 6 to the growth substrate.

In an embodiment, the capillary element 11a comprises a capillary wire element. In an advantageous embodiment, the capillary wire element 11a is flexible in order to float along with a water level for optimum contact with the water 6. In an advantageous embodiment, the capillary wire element 11a is a braided wire element for additional capillary action, for example a piece of string made of natural material, such as flax, or of plastic. In yet a further embodiment, the capillary element 11a is a tube element, wherein the tube element can be made relatively stiff in order to increase the ease of handling for automation.

For certain embodiments, it is possible to provide long open slots with a rising edge. A strip containing plant parts with or without growth substrates 11 can be placed on these slots.

In an embodiment, a tray bottom 2 of the container tray 1 may be provided with a profiled channel system 7, i.e. where a tray bottom 2 comprises a drainage channel 7 for discharging water from the container tray 1. As a result thereof, precipitation which is collected during outdoor growing can be collected in a lower collecting point of the container tray 1, and discharged.

In an embodiment, the container tray 1 can be formed by means of thermoforming—also referred to as vacuum forming. In this case, the container tray 1 is made of plastic. In an embodiment, for example 3-millimeter thick polystyrene sheet is used in this case. Other plastics which may be used for thermoforming may be: PVC, ABS, PE, PET, PMMA, PP etc. It is also possible to use thinner or thicker sheet material. Tests have shown that a sheet thickness of 3 or even 2.5 millimeters provides very good stability to the container tray 1. In a mould (tool), all desired shapes of the container tray 1 as a float/support are created in detail. The openings 4 can then be created in a subsequent processing step (cutting, drilling, milling, etc.). Of course, alternative production methods may be used, such as injection-moulding and 3D printing.

In an embodiment of the growing system, the container tray 1 comprises a tray bottom 2 and a continuous tray edge 3. In the tray bottom 2, through-holes or openings 4 are provided. In an embodiment, an opening 4 comprises a conically upright opening edge 5 (crater-shaped or pylon-shaped). It will be clear that the upright opening edge 5 may also have a different conical shape. However, this is not obvious in the context of automation. In an embodiment, the upright opening edge 5 of the opening 4 has a height of 10-150 millimeters. The height of the upright opening edge 5 prevents nutrient water 6 from flowing into the container tray. The height determination of the opening edge 5 is therefore completely dependent on the plants to be grown, and the expected increase in weight of the plant 15 per square meter during a respective growth period. Namely, a weight increase of one kilo per square meter will cause the container tray 1 to sink one millimeter deeper into the water 6. In a further embodiment, a container 8 can be placed on a conically upright opening edge (plant hole).

In an embodiment, the hole or opening 4 has a diameter of 7-150 millimeters. In an embodiment, the container tray 1 comprises a plurality of openings 4. The number of holes 4 or openings 4 per square meter is between 5-200. Variations of the number of holes per square meter, height of the upright hole edge and the diameter of the hole depend on the plant to be grown.

In an embodiment, the container tray 1 will have a width dimension of 60-300 centimeters and a length of 120-1360 centimeters. In an embodiment, continuous tray edges 3 of a container tray 1 have a height of 10-150 millimeters. In an embodiment, a profiled channel system is incorporated when thermoforming the container tray 1, comprising one or more drainage channels 7. Precipitation can flow to a lower central point which is formed for this purpose in the tray bottom 2, via the drainage channels 7. Due to the large dimensions of the container tray 1, the container tray 1 will remain stable in and on the water 6. When the container tray 1 is empty, the position in the water 6 will not be more than a few millimeters deep.

FIG. 6 shows a further embodiment of the container tray 1. The container tray 1 is provided with a tray edge 1 and with a parallel pattern of holes/openings 4 with an upright opening edge 5. As a result thereof, the container tray 1 will float on water 6, even if all holes/openings 4 are filled with plants comprising a substrate.

With most applications, growth substrates 11 are used as growth medium. In the most common embodiments, these growth substrates 11 are composed of organic soil mixtures of peat, sand and coconut fibre. These soil mixtures in turn form the basis for different embodiments as soil blocks, paper pots, glue plugs, Jiffy pots and so on. Mineral wool may also be used as growth substrate 11. The growth substrates 11 may comprise a volume of 1-500 cc. It is even conceivable for different forms of substrates 11, such as for example Jiffy pots, to be placed directly on the holes 4 of the container tray 1 without a container.

In an embodiment, it is also possible to use tubular film under the container tray 1 as a floating body in case of a high weight per square meter. Tubular film is made of polyethylene and is commercially available in large lengths and many widths. The tubular film as floating body is inflatable. When using tubular film as floating body, a very slight overpressure in the tubes suffices. A final overpressure of a few tens of millibars is already sufficient. Pressure sensors, height sensors or pressure readers can be operationally connected to a tube or a collection of tubes.

In an embodiment, it is also possible to incorporate a plant support in the container tray 1. Chrysanthemum wire or lily wire, which are known to the person skilled in the art, may be used as support material.

In a modified embodiment, the container tray 1 offers possibilities for, for example, growing leeks on water 6. In order to be saleable, leeks have to have sufficient 'white' on the underside of the plant. This white is normally formed in the ground, as this method of growing does not allow light. For cultivation on water 6 by means of a floating growing system, provisions have to be made in order to ensure a sufficient degree of 'white' during growth. In an embodiment, the leek plants are capable of forming sufficient 'white' if the conically upright edges are sufficiently high—here in their function as vertical, light-proof tunnel. An embodiment of two trays 1 one above the other is also an alternative to provide the upright edges collectively with sufficient light screening.

A profiled tray bottom 2 makes it possible to conduct the precipitation to a central point in the container tray via channels 7. This is therefore also the lowest point in the container tray 1. From this lowest point, the precipitation can be discharged. Discharging may be effected, for example, by sucking the water out. It is also possible to use lever action to a lower point outside the container tray 1. It will be clear that this embodiment is only necessary when growing plants outdoors, where precipitation is an issue.

Figure 7:
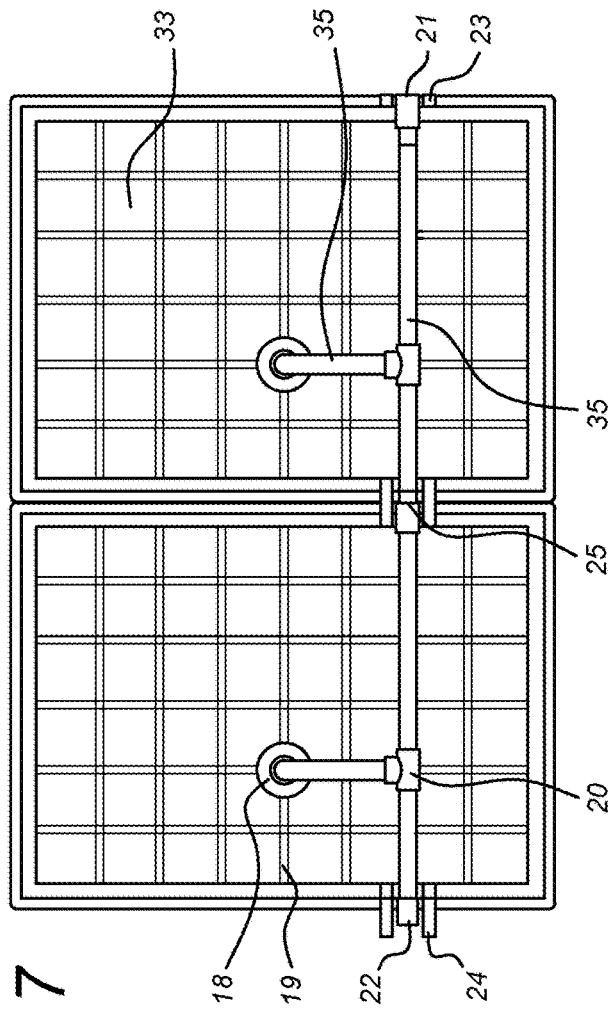
FIG. 7 shows a bottom view of two coupled container trays according to a further embodiment of the present growing system.

FIG. 7 shows an embodiment in which tubes 35 of a tube discharge system 35 are coupled to each other on an underside 33 of the container tray 1 by means of pushed-in centring pins 24 in the centring holes 23, thus creating a tube coupling 25. In a further embodiment, an insertion tube 22 of the tube 35 is provided with a 'sniffer nose', centring cone or an entry as a funnel. In an embodiment, the tubes 35 of the tube discharge system 35 are fitted under the container trays 1 by means of brackets. Furthermore, the tube discharge system 35 may comprise one or more T pieces 20 for coupling tubes 35 to one another.

A cross section of the discharge tube 35 depends on the required discharge capacity, but will, in most embodiments, have a diameter of 10-200 mm. The discharge tube 35 has a greater length or width than the container tray 1. As a result, the discharge tube 35 will project on one or two sides below the water line of the container tray 1. This projecting is necessary to make a coupling 25 of a series of container trays 1 possible.

In an embodiment, the uninterrupted discharge tube 25 under the container tray 1 is provided with an insertion tube 22 on one side, and with an insertion socket with sealing ring 21 on the other side. Due to this combination, a watertight connection is produced. If a series of container trays 1 are coupled to each other, one long discharge tube 35 consisting of forty or even more container trays 1 can be produced. In a further embodiment, a closing lid 26 is placed on the discharge tube 35 of a last container tray 1.

Figure 8:
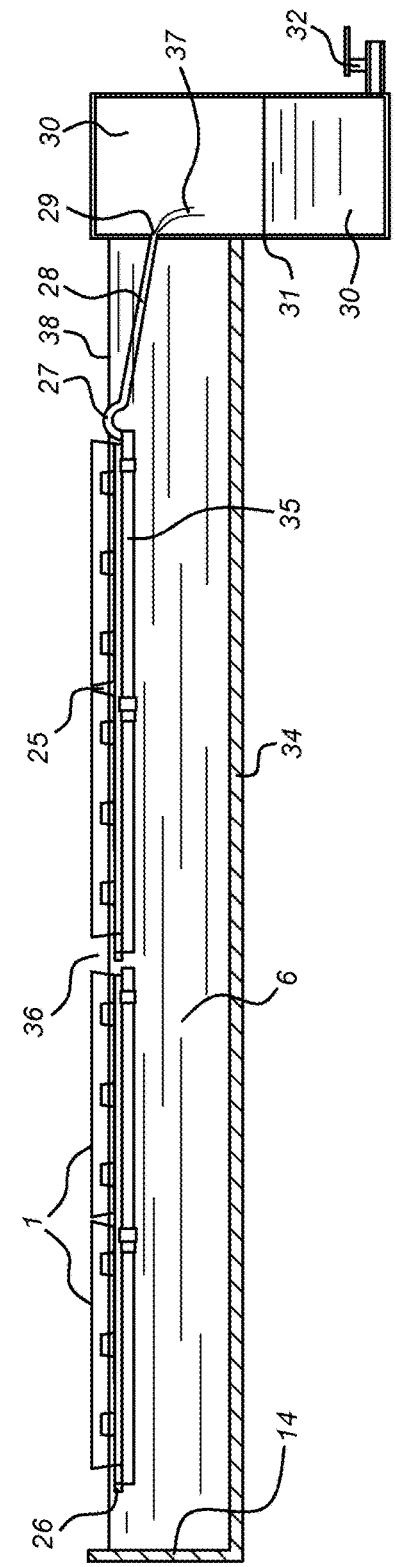
FIG. 8 shows a cross-sectional view of a complete growing system according to the present invention.

FIG. 8 shows the reservoir 14 comprising a reservoir level 38 of nutrient water 6, wherein a plurality of container trays 1 float on the nutrient water 6. In the illustrated embodiment, precipitation can be stored in a separate water buffer or discharge point 30 for later use, in which case excess precipitation can be discharged via surface water. In the illustrated embodiment, the growing system furthermore comprises a discharge hose 28 which is adapted to transport precipitation to a precipitation sink hole buffer 30. To this end, the reservoir 14 is provided with a hose lead-through 29, so that precipitation tank 37 can be discharged. A sink hole valve 32 is configured to adjust a water level 31 of the sink hole 30. The discharge hose 28 may furthermore be provided with a component which prevents the backflow of water into the discharge tubes 35, for example in the form of an inverted U-shaped tube part or trap 27, wherein the entire trap 27 will be situated under the level of the container tray 1. In case of heavy rain, the trap 27 will fill up completely, following which the discharge hose 28 will start to act as a lever and will pull water from the discharge tubes 35. When the diameter of the discharge hose 28 is approximately identical to that of the discharge tubes 35, the lever action will be best maintained, due to the fact that the height of the water column in the discharge hose generates an underpressure. The diameter of the discharge tube and discharge hose is determined by means of the desired discharge capacity.

In the illustrated embodiment, it is clearly visible that a last container tray 1 in the illustrated row of container trays 1 comprises a closing lid 26 for closing off the tube discharge system 35. Furthermore, a tube decoupling 36 is shown to indicate that the container trays 1 are disconnectably connected by means of the tube coupling 25.

Figure 9:
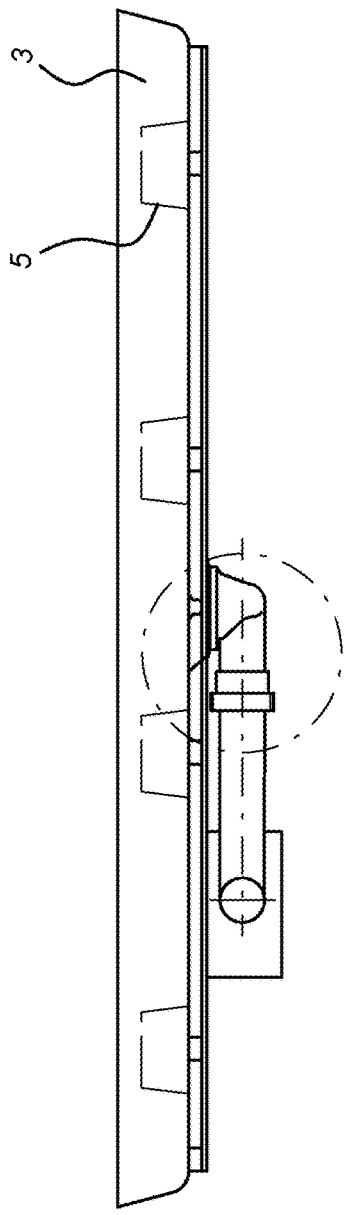
FIG. 9 shows a cross-sectional view of a container tray according to yet a further embodiment of the present invention.
Figure 9A:
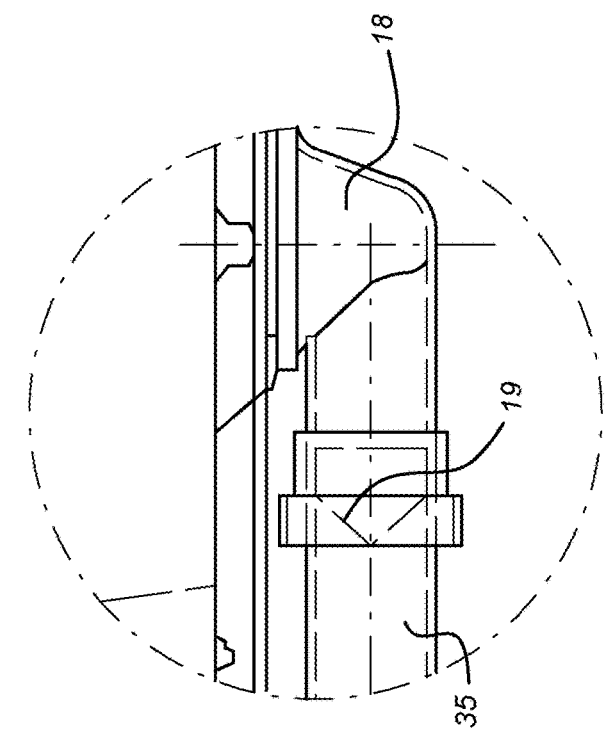
FIG. 9a shows a detail view of the container tray from FIG. 9.

FIGS. 9 and 9a show a side view of the container tray 1, lead-through plug 18 and non-return valve membrane 19. In an embodiment, the tube discharge system 35 is below the water line during use. A discharge opening 18 is provided at a central point in the tray bottom 2. A lead-through 18 is placed into this opening. This lead-through/discharge opening 18 may be configured as something which is known in the world of sanitary ware as a 'discharge plug' 18. Other kinds of lead-through means are possibly also conceivable.

In an advantageous embodiment, a one-way valve 19 or non-return valve 19 is fitted vertically or horizontally behind the discharge plug. In an embodiment, the one-way valve 19 comprises a self-closing membrane. In a further embodiment, the one-way valve 19 comprises a one-way ball valve 19 or non-return ball valve 19, wherein the one-way ball valve 19 comprises a movable floating ball which can be moved to and fro under the influence of a flow direction through the tube 35. The one-way ball valve 19 may have a horizontal or vertical orientation with respect to the container tray 1. In all embodiments, the one-way valve 19 serves to block water which is flowing back.

In the case of several container trays 1 which are connected to each other via the discharge tube 35, an underpressure ensures that the excess water in a container tray 1 is discharged. When a first container tray 1 is empty, air could be sucked in using a simple one-way valve, thus (partially) cancelling the underpressure in discharge tube 35 which is supposed to ensure the suction. By using the embodiment with a floating-ball valve as one-way valve 19 which can move as a result of a membrane ring, the ball valve 19 will ensure a sufficient degree of closure when the first container tray 1 is empty. Thus, no fresh air can be sucked into the system, as a result of which the underpressure remains intact. In this way, even the last container tray 1 can be sucked empty using lever action in the case of a long series of container trays 1. When uncoupling the container trays 1, the basin water 6 will possibly want to flow upwards into the tray via the tubes 35. Due to the (ping pong) ball of the one-way valve 19 floating, the upper membrane is closed off and this effect is prevented.

In a further variant, the one-way valve 19 is implemented as a hollow ball which is situated on top of the lead-through 18. As soon as there is excess water in the container tray 1, the hollow ball will start to float, as a result of which water is discharged via the lead-through to the discharge tube 35. By making the hollow ball 19 from a (silicone) rubber material, a good airtight sealing of the lead-through 18 can be achieved. By using sufficient material, sufficient weight is achieved for a good sealing, and by ensuring a sufficiently large hollow space in the ball, it still remains afloat on water.

In a further aspect, the invention relates to a method for growing a plant. According to the present method, growth substrates 11 comprising optionally rooted plants, cuttings, or other plant parts are placed against or in the nutrient water during a first growth period in order to stimulate root formation. After sufficient root formation has taken place during the first growth period, the growth substrates 11 are placed at an ample distance from the nutrient water 6 in subsequent growth periods. Experience has shown that the roots 12 formed during the first growth period and the capillary element 11a during subsequent growth periods have to extend sufficiently far into the water. It has been found that the plant builds up an increased resistance and is less susceptible to diseases and plagues.

The embodiment of the method according to the invention is divided into growth periods. In an embodiment, the first growth period may also serve as an extension of the raising period. In a further embodiment of the method, the containers 8 can be placed a second mutual distance apart after the first growth period which is greater than a first mutual distance (spacing). Following a second growth period, the containers 8 may be spaced again. Spacing the container trays 1 is also referred to as the 'tray method' and makes a more efficient use of the growing surface possible with automated spacing and harvesting. In principle, all forms of automation can be used. Complete rows of containers 8 with plants, for example growth substrates 11, can be picked up, moved or otherwise processed in one movement. Chrysanthemums can be placed directly into a hole/bore 16 of container 8 for the first growth period as a non-rooted cutting. In this case, the cutting is placed in the water 6 for root formation. This will take a few days to a week. After sufficient root formation, the plant can be placed with container 8 on the container tray 1/float 1. In this phase, it is important for the underside of the cutting to be at a sufficiently large distance from the underlying water 6. However, it is important that the roots 12 which have formed extend sufficiently far into the water 6. This cultivation method requires a plant support.

For a flower, the so-called 'lily forcing', bulbs can also be placed directly in containers 8 in the growing system together with a plant substrate 11, for example a Jiffy pot. The 'stem roots' which are formed in the process can extend as far as the nutrient water of the basin via the substrate. Plant support is desirable for this type of cultivation.

Lisianthus may for example be placed in a container 8 as a young rooted plant together with a growth substrate 11. For a first growth period, it is important to position the growth substrate exactly against the nutrient water. Roots will quickly be formed outside the substrate 11. Once sufficient roots have formed during the first growth period, the container 8 is displaced to the second growth period. In the second growth period, the growth substrate 11 is placed at an amply sufficient height above the water 6. However, it is important for the roots formed in the first growth period to extend sufficiently far into the nutrient water 6. A plant support is desired for this cultivation.

Growing a growth substrate 11, for example sand or coconut fibre, on water is in line with the government's efforts to make the horticultural sector more sustainable. The government imposes stringent rules on the sector, for example via the Water Framework Directive and the Nitrate Directive. In order to be able to meet these requirements, a different way of growing plants is almost inevitable. Cultivation 'away from the ground', for example, has the advantage that the ground water and surface water are not soiled by nitrate in an uncontrolled manner. In addition, growers require fewer crop protection means, since the plants can grow undisturbed and thus do not become sick as often. And herbicides are not necessary.

Advantages of the abovementioned growing system according to the invention may be summarized as follows:
the container tray 1 is hygienic and easy to clean, is advantageous and has an efficient design. The container tray 1 makes large dimensions possible and is configured for collecting and discharging precipitation. The container tray 1 makes it possible to fully automate the planting and harvesting of plants. The container tray 1 may be made of polystyrene and can easily be recycled for re-use.

According to the invention, the container 8, due to its design, may be picked up by a robot for spacing (increasing spacing) and harvesting plants. Fixing the container 8 on the hole edge or upright opening edge 5 of the container tray 1 gives great stability to the plants. In addition, removal of a substrate 11 and plant remains 11 after harvesting by means of the container 8 can be fully automated. The container 8 is hygienic and can easily be cleaned.

In other words, the present invention provides a float, carrier from a new shape, use is made of so-called ebb and flood bottoms as float/carrier. These bottoms are used in known rolling containers for horticulture. The plastic bottoms are always placed in an aluminium frame (carrier). The displacement takes place via a tube rail. Ebb and flood bottoms are made from polystyrene sheet by vacuum forming.

The present invention prevents the use of an aluminium frame as a carrier, but uses water as a carrier. The ebb and flood bottom according to the invention comprises a hole pattern 4, see FIG. 6. The bottom usually has an upright tray edge 3. This edge 3 may have a height of 0-200 mm. In advantageous embodiments, the holes or openings 4 are small upright conical pipes 5. Due to the upright edge 5 and small conical pipes 5, it is impossible for water to enter the tray bottom 2. The height of the small pipes 5 may vary between 0-150 mm. A cross section of the small pipes 5 may vary between 1-150 mm. After vacuum-sealing, the small pipes 5 may be closed. A top of the small pipes 5 may be opened by aftertreatment. Plants with or without substrate or plants in containers with or without substrate can be placed on pipe holes (plant holes) in the container tray 1.

In short, further advantages of the container tray 1 may be that the container tray 1 makes large dimensions possible. The material of the container tray 1 may be made of polystyrene sheet. The container tray 1 may be made of one type of material and is returned to the producer at the end of the service life for recycling. Furthermore, the bottom 2 may be profiled in such a way that air hoses can be accommodated therein and that the hoses remain in place. Due to the profiling in the bottom 2, rainwater can be directly transported away to the "sink hole" at the head ends of the ebb and flood bottom for outdoor cultivation. Rainwater can thus be collected centrally and be directly discharged or stored. Basin water 6 containing nutrients must not be discharged. The sheet material of the bottom 2 (container tray 1) may be extruded polystyrene, ABS or another plastic, such as polypropylene, usually having a thickness of 3 mm.

The present invention has been described above by means of a number of embodiments and with reference to the drawings. It will be clear that there are (functional) alternatives for various elements and that still more examples of embodiments are possible. All these variants and modifications are deemed to fall within the scope of protection which is defined in the attached claims.

List of reference numerals for the different elements of the growing system of the embodiments from FIGS. 1 to 9a:
1. Container tray
2. Tray bottom
3. Tray edge
4. Openings
5. Upright opening edge
6. Water with nutrient solution (nutrient water)
7. Drainage channel
8. Container
9. Flange edge
11. Growth substrate
12. Roots
13. Cutting
15. Plant
16, 17. Cutting holder/bore
18. Discharge opening/lead-through plug
19. One-way valve
20. T-piece tube
21. Insertion socket with sealing ring
22. Insertion tube
23. Centring holes
24. Centring pins
25. Tube coupling
26. Closing lid for last tray
27. Trap
28. Discharge hose
29. Hose lead-through through basin (reservoir)
30. Precipitation sink hole buffer
31. Sink hole water level
32. Sink hole valve
33. Container tray bottom underside
34. Reservoir bottom 35. Tube
36. Tube uncoupling
37. Precipitation tank
38. Reservoir level

The invention claimed is:

1. A growing system for growing plants, for example vegetables and ornamental plants, comprising:
an unenclosed container tray configured to float on nutrient water in a liquid reservoir during use, wherein the container tray comprises:
a flat tray bottom;
a continuous raised tray edge that extends at least 10 millimeters above the tray bottom;
a series of openings arranged in the tray bottom of the container tray, wherein:
each opening comprises a raised opening edge that extends at least 10 millimeters above the tray bottom,
the raised opening edges are configured to each hold a growth substrate completely above a water line of the nutrient water during use, and to allow roots of the plants to extend into the nutrient water; and
wherein the container tray, including the tray bottom, the raised tray edge, and the raised opening edge of each opening, is a single sheet of plastic material;
wherein the continuous raised tray edge and the raised opening edges of the openings provide buoyancy to the container tray; and
further comprising a series of containers for supporting the growth substrates, wherein the containers are removably arranged on the raised opening edges of the openings.

2. The growing system of claim 1, wherein the growth substrate comprises a capillary element which extends from the growth substrate into the nutrient water for transporting the nutrient water to the growth substrate.

3. The growing system of claim 2, wherein the capillary element comprises a capillary wire element or a capillary tube element.

4. The growing system of claim 2, wherein the capillary element is arranged in a bottom of a substrate container which is present around the growth substrate.

5. The growing system of claim 1, wherein at least one container comprises an outer surface arranged over the raised opening edge, wherein the outer surface is congruent with the raised opening edge.

6. The growing system of claim 1, wherein the containers are at least partly disposed between the raised opening edges of the openings.

7. The growing system of claim 1, wherein the raised opening edge of at least one opening is conical.

8. The growing system of claim 1, wherein at least one container comprises a flange edge.

9. The growing system of claim 1, wherein the tray further comprises a drainage channel for discharging liquid from the container tray.

10. The growing system of claim 1, wherein the continuous raised tray edge and the raised opening edges of the openings extend to a height above the tray bottom sufficiently high to cause the container tray to remain afloat such that no nutrient water overflows into the container tray when weight of 1 kilogram per square meter is added to the container tray.

11. The growing system of claim 1, wherein at least one container comprises an outer surface in contact with a raised opening edge.

12. A method for growing plants, for example vegetables and ornamental plants, using a growing system comprising an unenclosed container tray configured to float on nutrient water in a liquid reservoir during use, wherein the container tray comprises:
a flat tray bottom;
a continuous raised tray edge that extends at least 10 millimeters above the tray bottom;
a series of openings arranged in the tray bottom of the container tray, wherein:
each opening comprises a raised opening edge that extends at least 10 millimeters above the tray bottom,
the raised opening edges are configured to each hold a growth substrate completely above a water line of the nutrient water during use, and to allow roots of the plants to extend into the nutrient water; and
wherein the container tray, including the tray bottom, the raised tray edge, and the raised opening edge of each opening, is a single sheet of plastic material;
wherein the continuous raised tray edge and the raised opening edges of the openings provide buoyancy to the container tray;
further comprising a series of containers for supporting the growth substrates, wherein the containers are removably arranged on the raised opening edges of the openings; and
wherein the growth substrate comprises a capillary element which extends from the growth substrate into the nutrient water for transporting the nutrient water to the growth substrate;
the method comprising:
raising the growth substrate with the capillary element in the nutrient water during a first growth period in order to stimulate root formation;
placing the growth substrate at a further distance from the nutrient water for a second growth period, with the roots formed during the first growth period and the capillary element at least partly extending into the nutrient water.

13. A growing system for growing plants, for example vegetables and ornamental plants, comprising:
an unenclosed container tray configured to float on nutrient water in a liquid reservoir during use, wherein the container tray comprises:
a flat tray bottom;
a continuous raised tray edge that extends at least 10 millimeters above the tray bottom;
a series of openings arranged in the tray bottom of the container tray, wherein:
each opening comprises a raised opening edge that extends at least 10 millimeters above the tray bottom,
the raised opening edges are configured to each hold a growth substrate completely above a water line of the nutrient water during use, and to allow roots of the plants to extend into the nutrient water; and
wherein the container tray, including the tray bottom, the raised tray edge, and the raised opening edge of each opening, is a single sheet of plastic material;
wherein the continuous raised tray edge and the raised opening edges of the openings provide buoyancy to the container tray;
further comprising a series of containers for supporting the growth substrates, wherein the containers are removably arranged on the raised opening edges of the openings; and wherein the container tray comprises a tube discharge system which is connected to a discharge opening which is present in the tray bottom.

14. The growing system of claim 13, wherein the tube discharge system comprises a one-way valve for discharging liquid from the container tray to a sink hole in one direction.

15. The growing system of claim 13, wherein the tube discharge system of the container tray is arranged below a water line of the nutrient water.

16. The growing system of claim 13, wherein the growing assembly comprises a plurality of container trays, wherein the plurality of container trays comprises a disconnectable connection between the tube discharge system of two container trays which are arranged next to one another.

17. A method for growing plants, for example vegetables and ornamental plants, using a growing system comprising
an unenclosed container tray configured to float on nutrient water in a liquid reservoir during use, wherein the container tray comprises:
a flat tray bottom;
a continuous raised tray edge that extends at least 10 millimeters above the tray bottom;
a series of openings arranged in the tray bottom of the container tray, wherein:
each opening comprises a raised opening edge that extends at least 10 millimeters above the tray bottom,
the raised opening edges are configured to each hold a growth substrate completely above a water line of the nutrient water during use, and to allow roots of the plants to extend into the nutrient water; and
wherein the container tray, including the tray bottom, the raised tray edge, and the raised opening edge of each opening, is a single sheet of plastic material;
wherein the continuous raised tray edge and the raised opening edges of the openings provide buoyancy to the container tray;
further comprising a series of containers for supporting the growth substrates, wherein the containers are removably arranged on the raised opening edges of the openings; and
wherein the growth substrate comprises a capillary element which extends from the growth substrate into the nutrient water for transporting the nutrient water to the growth substrate;
the method comprising:
raising the growth substrate with the capillary element in the nutrient water during a first growth period in order to stimulate root formation;
placing the growth substrate at a further distance from the nutrient water for a second growth period, with the roots formed during the first growth period and the capillary element at least partly extending into the nutrient water.

18. The method of claim 17, wherein the capillary element comprises a capillary wire element or a capillary tube element.

19. The method of claim 17, wherein the capillary element is arranged in a bottom of a substrate container which is present around the growth substrate.

20. The method of claim 17, wherein at least one container comprises an outer surface arranged over the raised opening edge, wherein the outer surface is congruent with the raised opening edge.

21. The method of claim 17, wherein the containers are at least partly disposed between the raised opening edges of an opening.

22. The method of claim 17, wherein at least one raised opening edge is a conical upright edge.

23. The method of claim 17, wherein at least one container comprises a flange edge.

24. The method of claim 17, wherein the tray bottom comprises a drainage channel for discharging liquid from the container tray.

25. The method of claim 17, wherein the container tray comprises a tube discharge system which is connected to a discharge opening which is present in the tray bottom.

26. The method of claim 25, wherein the tube discharge system comprises a one-way valve for discharging the nutrient water from the container tray to a sink hole in one direction.

27. The method of claim 25, wherein the tube discharge system of the container tray is arranged below a water line of the nutrient water.

28. The method of claim 25, wherein the growing assembly comprises a plurality of container trays, wherein the plurality of container trays comprises a disconnectable connection between the tube discharge system of two container trays which are arranged next to one another.

* * * * *